(No Model.)
J. P. FERRENBURG.
CHURN.
No. 410,884. Patented Sept. 10, 1889.
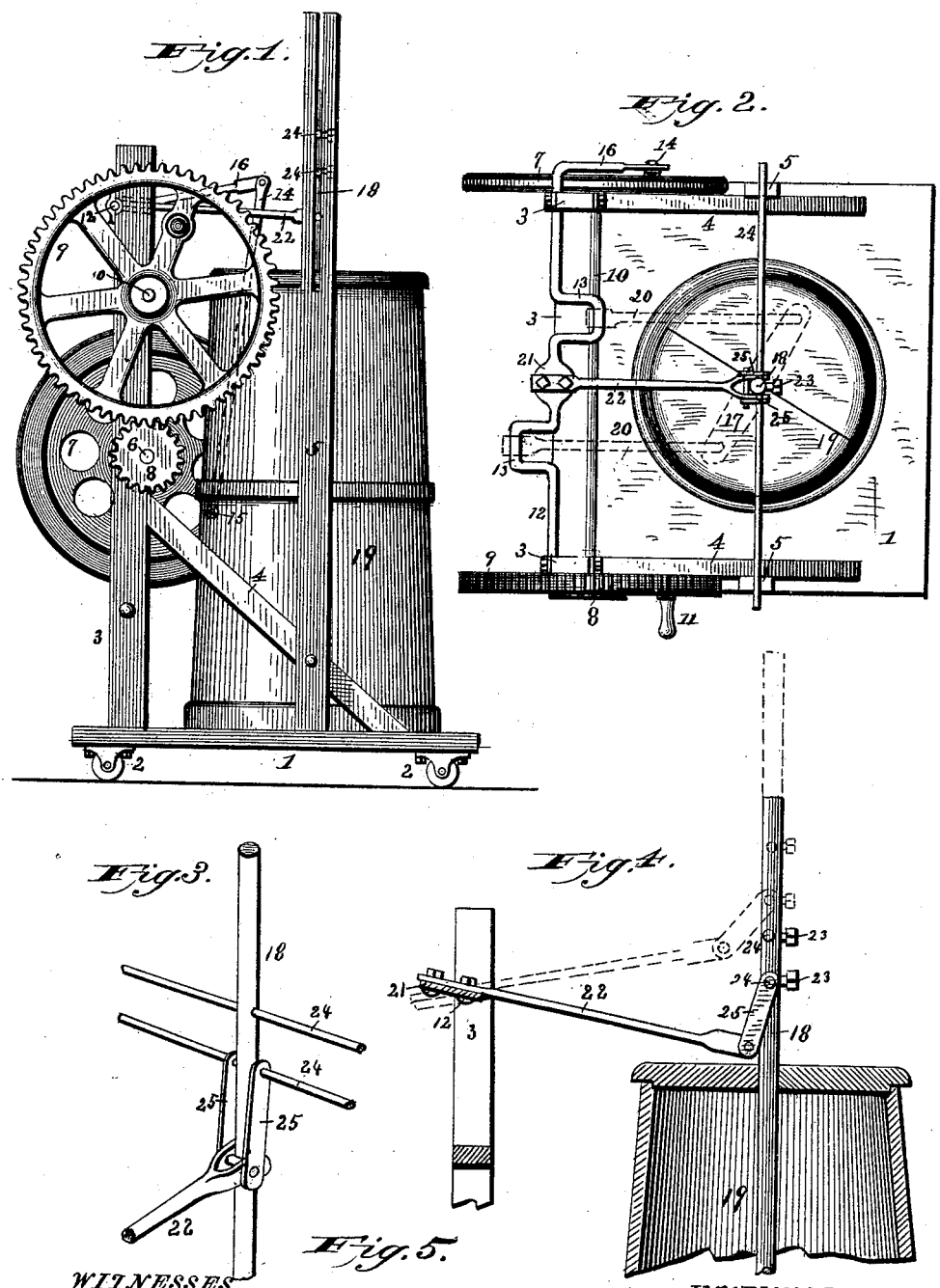
WITNESSES
INVENTOR
Attorney

UNITED STATES PATENT OFFICE.

JAMES P. FERRENBURG, OF HEGE, INDIANA.

CHURN.

SPECIFICATION forming part of Letters Patent No. 410,884, dated September 10, 1889.

Application filed April 11, 1889. Serial No. 306,767. (No model.)

*To all whom it may concern:*

Be it known that I, JAMES P. FERRENBURG, a citizen of the United States, residing at Hege, in the county of Jennings and State of Indiana, have invented certain new and useful Improvements in Churns, of which the following is a specification, reference being had therein to the accompanying drawings, in which—

Figure 1 represents a side elevation of my improved churn; Fig. 2, a plan view of the same; Fig. 3, a detail perspective view of a portion of the dasher-rod and operating mechanism; Fig. 4, a detail view, partly in section and partly in side elevation, of a portion of the churn and operating mechanism; and Fig. 5, a detail view of a slight modification, which will be fully hereinafter described.

The invention has particular reference to that class of churns covered by a patent issued to me on the 26th day of July, 1887, and numbered 367,284; and it has for its object, essentially, to provide such a churn with improved and simple means whereby the dasher-rod may have imparted to it either a vibratory movement or a reciprocatory movement, as the exigencies of the case may require, practically the same operating mechanism being employed for both movements, as will be more fully hereinafter set forth.

In the drawings annexed, the numeral 1 designates a suitable base, which may be provided with suitable casters 2, and has erected upon it an upright frame 3, which is stayed and strengthened by means of the inclined braces 4; also erected upon the said base and connected to the braces 4 are two uprights 5, provided with vertical slots at their upper ends. Journaled in suitable bearings upon the said frame 3 is the main driving-shaft 6, provided at one end with a fly-wheel 7 and at its other end with a pinion 8, which latter engages and is driven by a large spur-wheel 9, secured upon a shaft 10, also journaled upon the frame 3, the said spur-wheel 9 being provided with an operating-handle 11.

Journaled upon the frame 3 is a transverse rock-shaft 12, provided with two cranks 13, this rock-shaft being rocked by means of a pitman 14, pivotally connecting a wrist-pin 15, secured to the fly-wheel 7, to an arm 16 upon one end of the rock-shaft.

When it is desired to impart to the dasher a vibratory movement, the crank-arms 13 are connected to a horizontal arm 17, secured rigidly to the dasher-rod 18 of the churn 19 by means of rods 20, as shown in dotted lines in Fig. 2. This feature is more fully described and shown in my former patent.

When it is desired to impart to the dasher-rod a reciprocating movement, the rods 20 and arm 17 are removed and the following mechanism used. Bolted rigidly to a broad flat plate 21, formed on or secured to the middle of the rock-shaft 12, is a forwardly-extending rod or arm 22, which is bifurcated at its forward end to embrace the dasher-rod 18, as shown in Fig. 3. Passing through the dasher-rod and held adjustably and removably therein by means of set-screws 23 are two parallel rods 24, which work in the slots of the uprights 5, erected upon opposite sides of the base 1, and thereby serve to guide the dasher in its up-and-down movement.

By making the rods 23 removable the parts may be readily detached, and a new dasher of the vibratory character may be substituted.

Pivotally connecting the arms of the bifurcated portion of the arm 22 to the lower one of the guide-rods 24 are a pair of links 25.

It will be observed that by rocking the shaft 12 the dasher will be given a smooth up-and-down movement.

In lieu of the plate 21, the middle of the rock-shaft may be made square and the arm 22 rigidly attached to it by means of a clip 26, as shown in Fig. 5.

Having thus fully described my invention, what I claim, and desire to secure by Letters Patent, is—

The combination of a base provided with a frame 3 and slotted uprights 5, a rock-shaft 12, journaled upon the said frame, suitable mechanism for operating this shaft, a churn and dasher, an arm 22, rigidly connected to the said rock-shaft, rods secured to the churn-dasher and working in the slots in the said uprights, and pivotal links connecting the forward end of the arm 22 to one of the rods secured to the dasher, as and for the purpose set forth.

In testimony whereof I affix my signature in presence of two witnesses.

JAMES P. FERRENBURG.

Witnesses:
D. M. BRANHAM,
W. E. SPRINGER.